United States Patent Office 2,905,264
Patented Sept. 22, 1959

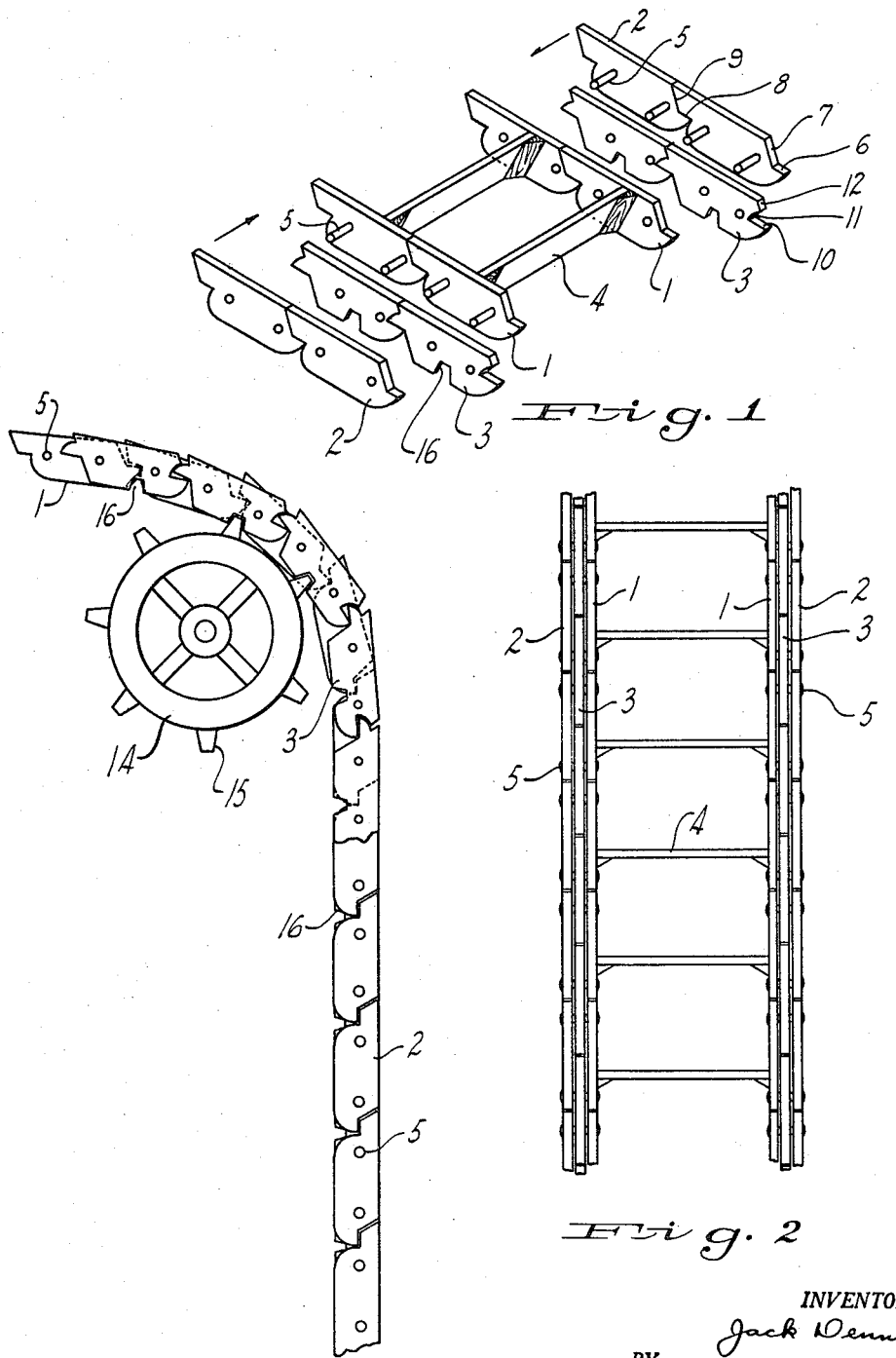

2,905,264

COMPOSITE LINK STRUCTURES FOR COLLAPSIBLE LADDERS, CONVEYORS, OR THE LIKE

Jack Dennis, Library, Pa.

Application February 20, 1957, Serial No. 641,285

3 Claims. (Cl. 182—163)

This invention relates to new and useful improvements in jointed link structures for use in folding ladders or as conveyor members, and it is among the objects thereof to provide a composite link design consisting of an inner link and outer links joined together to be relatively pivotal in one direction and rigid when the links are pivoted in the opposite direction.

The invention will become more apparent from a consideration of the accompanying drawing constituting a part hereof in which like reference characters designate like parts and in which:

Figure 1 is an exploded isometric view of a portion of a ladder construction with folding links embodying the principles of this invention;

Figure 2, a front elevational view of the link construction of Figure 1 in the form of a folding ladder in its extended position; and, Figure 3, a side elevational view of the assembled pivotal link structure.

With reference to the several figures of the drawing, the sides or stringers of the ladders consist of links 1 and 2 with links 3 interposed therebetween, the links 1 being connected by rungs 4. Links 1, 2 and 3 are joined by pins 5 to permit relative pivotal movement of the outer, inner and intermediate links that constitute side frame members.

As shown in Figure 1, the outer and inner links 1 and 2 are of light construction being provided with shoulders 6 and beveled faces 7 that engage complementary shaped shoulders 8 and beveled faces 9 of the next adjacent link. By virtue of this construction, the links may be pivoted in the direction in which the shoulders 8 and beveled faces 9 separate from shoulders 6 and beveled faces 7, but in the opposite direction of pivotal movement the links are interlocked and become rigid.

The intermediate links 3 are provided with shoulders 10 and a curved face 11, together with a beveled face 12 for engaging the complementary shaped end of an adjacent link, as shown by the pair of assembled inner links 3 of Figure 1. The rungs 4 are connected to the inner links or sections 1 in the manner shown in Figure 1 and the assembled construction when joined by the pins or rivets 5 provides a strong durable structure which may be used as a folding ladder or as a link conveyor.

The upper portion of the link construction employing rungs when used as a ladder will fold back and disappear in the opening of the ceiling as the ladder is being raised in the manner shown in Figure 3, although the links are not shown inclined as they would be when one end is supported as a ladder. In Figure 3, a sprocket wheel 14 of which there are two in axial alignment, engage the inner links 3 with the teeth 15 of the wheel engaging the notches 16 of the inner links. The wheels 14 guide the links to the rear of the ceiling opening when the construction is a folding or disappearing ladder, or the wheels 14 may act as idler wheels or as drive wheels when motor driven to constitute the link structures an endless conveyor. The straight portion of the ladder, when inclined or vertically disposed is rigid on the side where the rungs are available for stepping, and will hold the weight for which the sections or links and pivot pins are designed.

When used as an endless conveyor, the links or sections may be provided with pans or scrapers instead of the ladder rungs 4 and the load bearing strand would be rigid across the entire span between supporting pulleys because of the interacting or interlocking feature of the shoulders 6 and 8 and the beveled or inclined faces 7 and 9, while permitting curvature of the links around the drive and idler drums.

Although one embodiment of the invention has been herein illustrated and described, it will be evident to those skilled in the art that various modifications may be made in the details of construction without departing from the principles herein set forth. For example, the links may be made of any material and of any size for any specific use.

I claim:

1. A sectional stringer for ladders and conveyors comprising a plurality of outer links and inner links in parallel alignment having intermediate links in staggered relation with the outer and inner links to straddle the joints of the outer and inner links, the outer and inner links having complementary interacting shoulders and beveled faces at their respective ends, the intermediate links having interacting shoulders and rounded faces at their ends and pins extending through said links to constitute pivotal connections for angular movement of said links in the direction of separating and closing of the interacting end faces of said links.

2. A folding ladder comprising a pair of stringers consisting of a plurality of outer links and inner links in parallel alignment having intermediate links straddling the joints of the outer and inner links, the outer and inner links having complementary interacting shoulders and beveled faces at their respective ends, the intermediate links having interacting shoulders and rounded faces at their ends and pins extending through said links to constitute pivots for angular movement of said links in one direction only and rungs secured to the juxtaposed faces of the inner links of said pairs of stringers to constitute the structure a folding ladder.

3. A sectional stringer for ladders and conveyors comprising a plurality of outer links and inner links in parallel alignment having intermediate links in staggered relation with the outer and inner links to straddle the joints of the outer and inner links, the outer and inner links having complementary interacting shoulders and beveled faces at their respective ends, the intermediate links having interacting shoulders and rounded faces at their ends and pins extending through said links to constitute pivotal connections for angular movement of said links in the direction of separating and closing of the interacting end faces of said links, said intermediate links having recesses on their lower faces for engaging the teeth of a wheel on which said links are supported.

References Cited in the file of this patent

UNITED STATES PATENTS

| Number | Name | Date |
|---|---|---|
| 239,921 | Bender | Apr. 12, 1881 |
| 361,616 | Cornog | Apr. 19, 1887 |
| 511,447 | Morris | Dec. 26, 1893 |
| 726,682 | Hartigan | Apr. 28, 1903 |
| 953,429 | Morse | Mar. 29, 1910 |
| 1,266,572 | Fisher | May 21, 1918 |
| 1,744,239 | Morgan | Jan. 21, 1930 |
| 2,498,788 | Bremer | Feb. 28, 1950 |
| 2,602,345 | Braumiller | July 8, 1952 |